(12) United States Patent
Schmauder et al.

(10) Patent No.: US 10,940,571 B2
(45) Date of Patent: Mar. 9, 2021

(54) METHODS AND MACHINES FOR THE CUTTING PROCESSING OF A PLATE-TYPE MATERIAL

(71) Applicant: TRUMPF Werkzeugmaschinen GmbH + Co. KG, Ditzingen (DE)

(72) Inventors: Frank Schmauder, Metzingen (DE); Bernd Hermann Renz, Marbach am Neckar (DE); Andrea Schaerer, Gruesch (CH)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 245 days.

(21) Appl. No.: 16/151,553

(22) Filed: Oct. 4, 2018

(65) Prior Publication Data

US 2019/0039197 A1    Feb. 7, 2019

Related U.S. Application Data

(63) Continuation of application No. PCT/EP2017/058137, filed on Apr. 5, 2017.

(30) Foreign Application Priority Data

Apr. 7, 2016  (DE) .......................... 102016106408.4

(51) Int. Cl.
*B23Q 11/00*   (2006.01)
*B23K 37/04*   (2006.01)
(Continued)

(52) U.S. Cl.
CPC ...... *B23Q 11/0032* (2013.01); *B23K 26/0876* (2013.01); *B23K 26/38* (2013.01);
(Continued)

(58) Field of Classification Search
CPC ....... B23Q 11/0032–0039; B23K 26/36–2388; B23K 37/04–0408
See application file for complete search history.

(56) References Cited

U.S. PATENT DOCUMENTS 4,739,545 A * 4/1988 Oyanagi .................. B23Q 1/36
                                                         101/407.1
5,098,005 A * 3/1992 Jack .................... B23K 26/0838
                                                         198/345.3
(Continued)

FOREIGN PATENT DOCUMENTS

DE    38 14 181      11/1989
DE    195 81 537     6/1997
(Continued)

OTHER PUBLICATIONS

English translation of JP2007230291 to Uchida (Year: 2007).*
(Continued)

*Primary Examiner* — Michael A Laflame, Jr.
(74) *Attorney, Agent, or Firm* — Fish & Richardson P.C.

(57) ABSTRACT

The invention relates to a method for the cutting processing of a panel-type material in a machine which comprises a processing station in a machine base frame, and the processing station is assigned a loading and unloading station. The panel-type material is laid on a pallet which is movable between the processing station and the loading and unloading station, and the pallet is moved into the processing station for subsequent processing and is positioned on a pallet carrier of the machine base frame for the subsequent processing of the panel-type material, wherein, before the start of the processing process of the panel-type material by the processing unit, the pallet is lifted from the pallet carrier by an air spring device and is positioned in a manner decoupled from the pallet carrier, and after the processing (Continued)

process of the panel-type material, the pallet is coupled to the pallet carrier.

20 Claims, 5 Drawing Sheets (51) Int. Cl.
  *B23K 26/08* (2014.01)
  *B23K 26/38* (2014.01)
  *B23Q 1/01* (2006.01)
  *B23K 101/18* (2006.01)

(52) U.S. Cl.
  CPC ...... *B23K 37/0408* (2013.01); *B23K 37/0461* (2013.01); *B23Q 1/015* (2013.01); *B23K 2101/18* (2018.08)

(56) References Cited

U.S. PATENT DOCUMENTS

| | | | | | |
|---|---|---|---|---|---|
| 5,704,409 | A | * | 1/1998 | Brisson | B23Q 11/0032 144/208.1 |
| 5,988,959 | A | * | 11/1999 | Sugata | B23Q 1/0009 408/143 |
| 6,254,463 | B1 | * | 7/2001 | Case | B23Q 11/0032 451/121 |
| 7,087,858 | B2 | * | 8/2006 | Egashira | B23K 26/08 219/121.82 |
| 10,307,875 | B2 | * | 6/2019 | Schmauder | B23Q 7/1431 |
| 2009/0289043 | A1 | * | 11/2009 | Kilibarda | B23K 37/047 219/136 |
| 2015/0273387 | A1 | * | 10/2015 | Hayashi | B23K 35/383 96/7 |
| 2015/0273633 | A1 | | 10/2015 | Masauji et al. | |
| 2016/0250718 | A1 | * | 9/2016 | Tanahashi | B23K 26/0876 219/121.8 |
| 2016/0318126 | A1 | * | 11/2016 | Okazaki | B23K 26/0876 |
| 2018/0043479 | A1 | * | 2/2018 | Deiss | B23K 37/047 |

FOREIGN PATENT DOCUMENTS

| | | |
|---|---|---|
| DE | 10 2004 038 383 | 3/2006 |
| EP | 1803967 | 7/2007 |
| EP | 2926941 | 10/2015 |
| JP | 2007/230291 | 9/2007 |
| JP | 2009/248219 | 10/2009 |
| WO | WO 9620065 | 7/1996 |
| WO | WO 2015/078246 | 6/2015 |

OTHER PUBLICATIONS

English translation of JP2009248219 to Ebihara (Year: 2009).*
International Search report and Written Opinion in International Application No. PCT/EP2017/058137, dated Jul. 28, 2017, 17 pages (with English translation).
International Preliminary Report on Patentability in International Application No. PCT/EP2017/058137, dated Oct. 9, 2018, 5 pages (English translation).

* cited by examiner

METHODS AND MACHINES FOR THE CUTTING PROCESSING OF A PLATE-TYPE MATERIAL

CROSS REFERENCE TO RELATED APPLICATIONS

This application is a continuation of and claims priority under 35 U.S.C. § 120 from PCT Application No. PCT/EP2017/058137 filed on Apr. 5, 2017, which claims priority from German Application No. DE 10 2016 106 408.4, filed on Apr. 7, 2016. The entire contents of each of these priority applications are incorporated herein by reference.

TECHNICAL FIELD

The invention relates to methods for cutting of a plate-shaped material in a machine as well as a machine for cutting of the plate-shaped material.

BACKGROUND

A laser cutting machine is described in U.S. Pat. No. 7,087,858 B2 that includes a machining station to which a loading and unloading station is assigned. A plate-shaped workpiece is placed on a displaceable pallet in the loading and unloading station and retracted into the machining station. Subsequently, a machining process is carried out. Here, the pallet is located resting directly on a pallet feeder in a position that is retracted in the machining station. This machining station comprises a multi-axis system on which a machining head is displaceable relative to the plate-shaped workpiece for its machining. During acceleration and deceleration of the machining head within a machining space of the laser-cutting machine, impulse-like force effects occur, whereby both the pallet and the plate-shaped material resting on the pallet are excited to vibrate. These vibrations can lead to intolerable contour mistakes on the workpiece to be produced. To reduce these mistakes, the movement dynamics of the machining head can be reduced; however, the efficiency of the machine or the duration of a work cycle for machining the plate-shaped materials thus changes considerably.

A laser beam machining device or fluid jet machining device is described in EP 2 926 941 A1, in which a displaceably arranged machining head of a machining device is provided on a base framework. The machine base framework receives a workpiece support which is supported by rollers on the machine base framework. At least one damping element is provided in a vibration-transmitting connecting path between the machining head of the laser beam device or jet stream device and the workpiece support for increasing the machining and cutting quality with simultaneously higher machine dynamics. These damping elements are provided on a peripheral side surface of a frame of the tool support and between the side surface of the frame of the workpiece support and the machine frame. The damping elements are braced between the side surface of the frame of the workpiece support and the machine frame and a damping effect is thus achieved. Here, the rollers of the workpiece support furthermore rest on the machine base framework.

SUMMARY

This disclosure provides methods and machines for cutting of a plate-shaped materials with significantly reduced transmission of vibration-exciting forces from the machining station to the pallet receiving the workpiece in a machining station.

In one aspect, the disclosure features methods for cutting (or separative machining) of a plate-shaped material. Pallets are retracted in a machining station of the machining machine, are lifted with an air spring device before the beginning of a machining process, and are positioned to be decoupled from an associated pallet carrier. The pallet carrier can be arranged on a base framework or a base body of the machine.

The pulse-like force effects generated by the displacement movements of a machining head in the machining machine due to the acceleration and deceleration of the machining head are virtually fully isolated after the lifting and decoupling of the pallet from the pallet carrier and thus also from the machine base body. Such force effects resulting from the machining head or a one- or multi-axis system in which the machining head is guided can lead to resilient displacements in a range of several hundredths of millimeters. Because an air spring device has a very low spring stiffness and the pallet forms a large inertial mass with the resting plate-shaped material, only an extremely low force effect is transmitted to the pallet in the decoupled state of the pallet or this force effect is even completely isolated. Thus, accuracy-reducing resilient displacements of the workpiece are strongly reduced and the movement dynamics of a machining head within the machining station can be further increased, whereby the productivity is increased.

The pallet can be held in the lifted position during the entire machining process of the plate-shaped material, and at the end of the machining process is deposited on the pallet carrier again. The pallet can subsequently be displaced, e.g., guided out of the machining station.

The pallet can be transferred by at least three air spring modules of the air spring device into a lifted position. A statically determined three point support is thus achieved which is also formed sufficiently stably to hold the pallet in the lifted position during the machining of the plate-shaped material.

During activation of an air spring module, a lifting cylinder, which can be a rolling membrane cylinder, is extended and guided out. Such lifting cylinders supplied with air, in particular rolling membrane cylinders, have the advantage that they can generate very high static forces, but simultaneously have very low spring stiffness enabling high vibration absorption. Thus, highly dynamic movements are not transmitted by such pneumatically supplied lifting cylinders that are also referred to as air springs. Here, the lifting cylinder typically engages on an underside of the pallet frame of the pallet. This enables a simple construction and a secure lifting of the pallet. However, alternatively the air spring modules can be arranged on the pallet, e.g., on the pallet frame, and the lifting cylinders engage on the pallet carrier or engage on the machine base framework directly and lift the pallet from the pallet carrier in this way.

The lifting and decoupling of the pallet from the pallet carrier can be monitored by at least one distance control device of the air spring module. Here, a distance control device is advantageously assigned to the lifting cylinder. It can thus be simultaneously ensured that both a uniform lifting and/or lowering of the pallet and a horizontal orientation of the pallet in the lifted state is achieved.

A tactile, pneumatic directional valve can be used as a distance control device. This tactile directional valve controls the delivery and removal of compressed air to the lifting cylinder depending on the deflection of the directional valve and forms an air spring module together with this lifting cylinder, the air spring module being controlled to a fixed lifting position. The lifting and lowering of the lifting cylinder takes place via a further directional valve upstream of the tactile directional valve, wherein the further directional valve switches the compressed air supply on and off.

Four or more air spring modules or lifting cylinders form the air spring device and are activated for transferring the pallet from a retracted or resting position in the machining station into a lifted position. A respective equal number of lifting cylinders can be assigned to two respective longitudinal sides of the machine base framework. Here, at least three lifting cylinders are controlled air spring modules that are arranged with at least one air spring module assigned to a first longitudinal side of the machine base framework and at least two air spring modules assigned to the second longitudinal side of the machine base framework; a statically determined three-point support thus arises. The at least one further uncontrolled lifting cylinder is connected in parallel with the nearest lifting cylinder of a controlled air spring module.

A stable four-point, six-point, etc., support is thus enabled, wherein a statically determined supporting of the pallet in the lifted state relative to the pallet feeder is enabled by the three directly controlled air spring modules. The air spring modules or lifting cylinders are arranged either on the pallet carrier or on the base framework of the machine, adjacent to the pallet carrier. The at least one lifting cylinder, connected in parallel to one of the three air spring modules, acts like a force-controlled air spring due to the pressure compensation via the parallel pressurization.

The machining head can be displaceably guided on the machine base framework for machining the plate-shaped material. A decoupling of the machining head from the machine base framework can be dispensed with by decoupling the pallet from the pallet carrier.

In another aspect, the disclosure features machines for cutting and separative machining of a plate-shaped workpiece. The machines include a machining station in which the cutting of the workpiece resting on a pallet takes place by a machining head, a loading and unloading station being assigned to the machining station outside the machining station, wherein the pallet receiving the plate-shaped workpiece is displaceable between the machining station and the loading and unloading station (for example by means of a driven chain) and, in the machining station, can be retracted onto a pallet carrier provided on the machine base framework. Here, the pallet carrier can be connected to the machine base framework or can be part of the machine base framework. An air spring device transfers the pallet when retracted into the machining station from a position resting on the pallet carrier (initial position) into a position that is lifted with respect to the pallet carrier. The pallet having the plate-shaped material resting thereon can be lifted by the air spring device during a machining process and can thus be physically decoupled. The pallet is thus suspended relative to the machine base framework by the air spring device during the machining. This enables an almost complete isolation of the pallet from the vibrations generated by the machining head that are transmitted to the machine base framework due to its movement dynamics.

The air spring device advantageously includes at least three air spring modules that transfer the pallet between the position resting on the pallet carrier and the lifted position. By such air spring modules, the statically determined receiving or positioning of the pallet is thus enabled in a contact-free manner or decoupled from the machine base framework.

The air spring module typically includes at least one lifting cylinder and a distance control device. A working stroke of the lifting cylinder can thus be directly monitored at the lifting point by this distance control device. The at least one lifting cylinder and the distance control device are advantageously provided on a mutual mounting plate. This enables a fast and simple mounting of such air spring modules.

The distance control device can be formed as a tactile directional valve that typically controls a pneumatic working medium for the lifting cylinder.

According to some embodiments of the air spring device, three air spring modules are used, whereby there is a statically determined three-point support for the pallet.

Furthermore, the air spring modules are typically applied to the pallet carrier or the machine base framework and the lifting cylinder of the respective air spring module engages on an underside of a pallet frame of the pallet. Previous displaceable pallets can thus be further used. Furthermore, this arrangement of the air spring modules represents a variant that is constructive and very simple with respect to the pneumatic connectors. It is alternatively also possible that the air spring modules are arranged on the pallet e.g., on the pallet frame, and the lifting cylinders engage on the pallet carrier or directly on the machine base framework, e.g., in the reverse action direction with respect to the first variant. In this latter variant, a device is provided in the machine that enables a coupling of the air spring modules that are displaceable with the pallet to the air spring supply.

The air spring modules typically include a working stroke of the lifting cylinder, such that the pallet can be lifted decoupled or contact-free with respect to the pallet carrier. Thus the machine base framework is lifted after an at least partial pass of the working stroke. Depending on the mounting of the air spring modules to the pallet carrier or on the machine base framework, the working stroke can be adapted to ensure lifting and decoupling of the pallets from the pallet carrier and thus from the machine base framework during the arrangement of the pallet in a machining position for carrying out the machining process.

According to additional embodiments of the air spring device, at least two lifting cylinders are assigned to each longitudinal side of the machine base framework. These are typically provided near to a corner region of a pallet frame of the pallet, such that edge regions of the plate-shaped workpiece are also securely supported during machining. By the positioning of the air spring modules or lifting cylinders respectively on the longitudinal side of the machine base framework, an in-between region remains free, such that residues, burn-off or similar can furthermore fall into the machine base framework and, if necessary, can be transported away.

Control of the air spring device having at least four lifting cylinders can include an equal number of lifting cylinders arranged respectively on two longitudinal sides of the machine base framework and at least one air spring module assigned to the first longitudinal side and at least two air spring modules assigned to the second longitudinal side of the machine base framework, which are supplied with the fluid for the working stroke in a controlled manner. At least one further lifting cylinder is connected in parallel with one of the three air spring modules that are supplied with the fluid in a controlled manner. An air spring module having two lifting cylinders arises by the parallel connection. In this way, a statically determined three-point support can in turn also be achieved with four lifting cylinders engaging on the pallet.

DESCRIPTION OF DRAWINGS

The invention as well as further advantageous embodiments and developments of the same are described and explained in the following using the examples depicted in the drawings. The features that arise from the description and the drawings can be applied individually or together in any combination.

DETAILED DESCRIPTION

Figure 1:
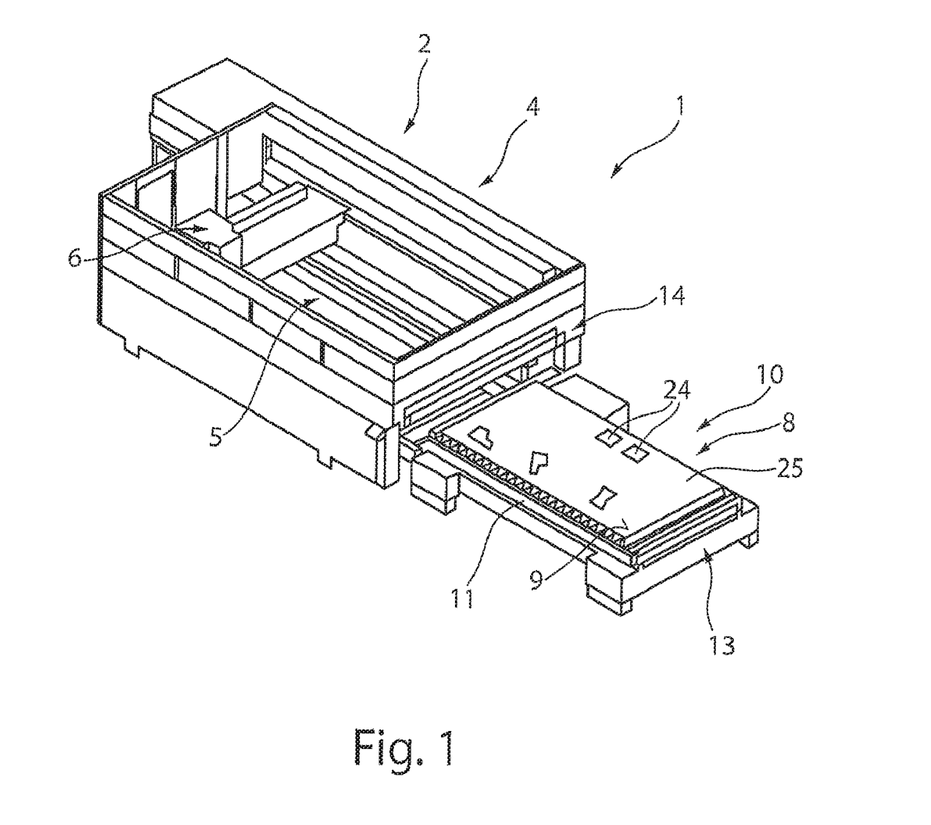
FIG. 1 is a perspective view of an installation for machining plate-shaped material.

FIG. 1 depicts an installation 1 for cutting of plate-shaped materials 8 that consist, for example, of metal. This installation 1 includes a machine 2 that is shown in further detail in FIG. 2. This machine 2 is surrounded by an enclosure 4. Within the enclosure 4 is a machining station 5, in which a machining unit 6 having at least one machining head 7 (see FIG. 2) is displaceable within a horizontal movement plane. Outside the housing 4 is a loading and unloading station 10. This includes at least one displaceable pallet 11 on which the plate-shaped material 8 is rested for machining. This loading and unloading station 10 is formed of a so-called pallet chamber 13 on which the pallet 11 is supported. Additionally and not depicted in more detail, a handling device can be assigned to the loading and unloading station 10, by which the plate-shaped material 8 is placed on the pallet 11 in an unprocessed form—e.g., as a raw material—before the pallet 11 is moved into the machining station 5. The pallet 11 is retracted through an opening 14 in the enclosure 4. Processing of the plate-shaped material 8 takes place to produce workpieces 24 simultaneously creating residual parts and a residual grid 25. Finally, the machined plate-shaped material 8 can be displaced into the loading and unloading station 10 again by the pallet 11, so that the pallet 11 can be unloaded. This can take place via the handling device. The pallet 11 is subsequently equipped with an un-machined plate-shaped material 8.

Figure 2:
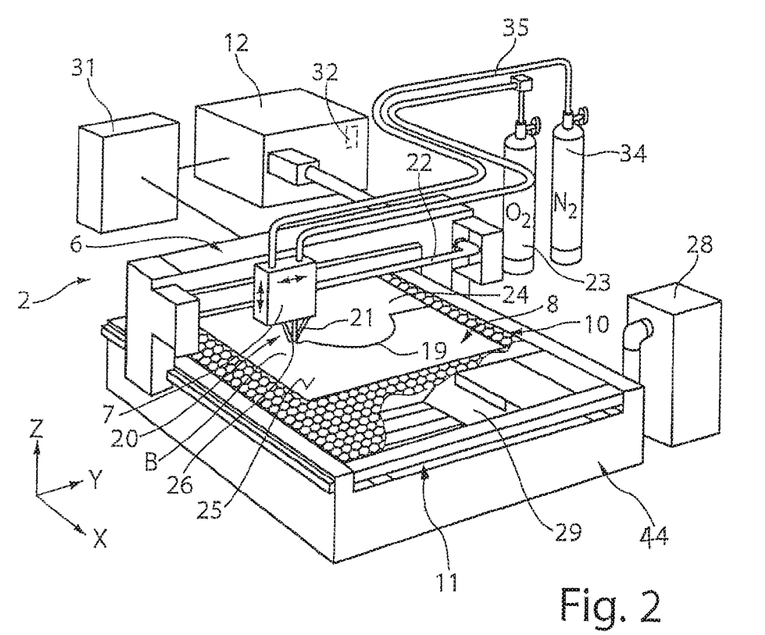
FIG. 2 is a perspective view of a machine of the installation in FIG. 1.

This installation 1 can, for example, be formed as a laser cutting installation that includes a laser-cutting machine as the machine 2, which is described exemplarily in more detail in FIG. 2. Furthermore, the machine 2 can also be a plasma-cutting machine, a stamping laser machine, a laser-welding machine, or a stamping machine.

In FIG. 2, the machine 2 is depicted as a laser machine. This is, for example, a $CO_2$ laser-cutting machine having a $CO_2$ laser source 12. A laser beam 21 generated by the laser source 12 is guided by a beam guide 22 by deflection mirrors (not depicted in more detail) to the laser cutting head 7 and focused in this laser cutting head. The laser beam 21 is then oriented perpendicular to the surface of a plate-shaped material 8 by a cutting nozzle 20. The beam axis (optical axis) of the laser beam 21 runs perpendicular to the surface of the plate-shaped material 8. The laser beam 21 acts at the process location B together with a process gas jet 26 on the plate shaped material 8. Alternatively, the laser-cutting machine 2 can have a solid-state laser as a laser source, the radiation of which is guided to the laser cutting head 7 with the aid of an optical cable.

Piercing takes place for laser cutting of the plate-shaped material 8 with the laser beam 21 while delivering a process gas jet 26. The laser beam 21 is moved over the plate-shaped material 8, such that a continuous cutting gap 19 arises at which the laser beam 21 severs the plate-shaped material 8. At least one workpiece 24 which has been cut free thus arises in the residual grid 25.

The particles and gas arising during the piercing and laser cutting can be extracted with the aid of a suction device 28 from a suction chamber 29.

The control of the laser-cutting machine 2 and/or the installation 1 takes place via a machine control device 31. The machine control device 31 controls, for example, the piercing operation and takes over the further control tasks of the laser-cutting machine 2 for forming the cutting gap 19. The machine control device 31 is connected by signal transmission with a laser control device 32 that is typically integrated into the laser source 12.

Figure 3:
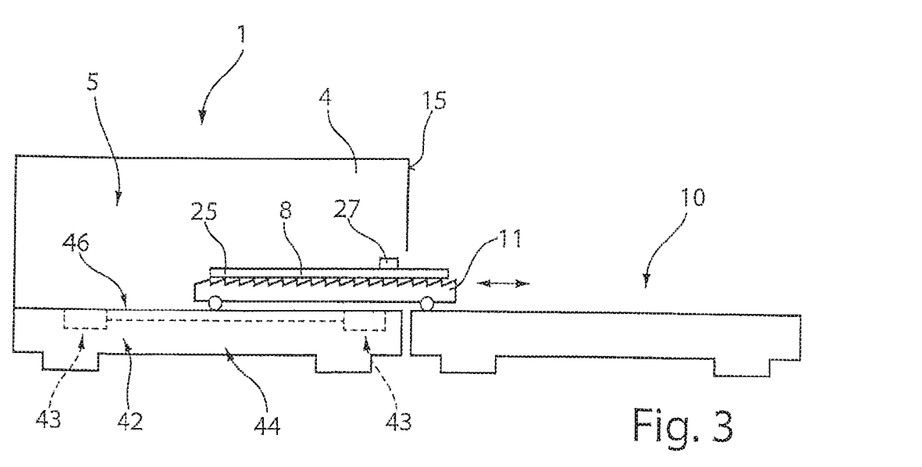
FIG. 3 is a schematic side view of the installation during a retraction movement of a pallet from a loading and unloading station into a machining station.

FIG. 3 shows a side view of the installation 1 in which the pallet 11 is retracted into the machining station 5 for machining the plate-shaped material 8. The machine 2 has an air spring device 42 that consists of several air spring modules 43. These air spring modules 43 are fastened to a machine base framework 44 of the machining station 5. These air spring modules 43 are arranged on or adjacent to a pallet carrier 46 (see FIG. 4), on which the pallet 11 can be extended and retracted in and out of the machining station 5.

Figure 4:
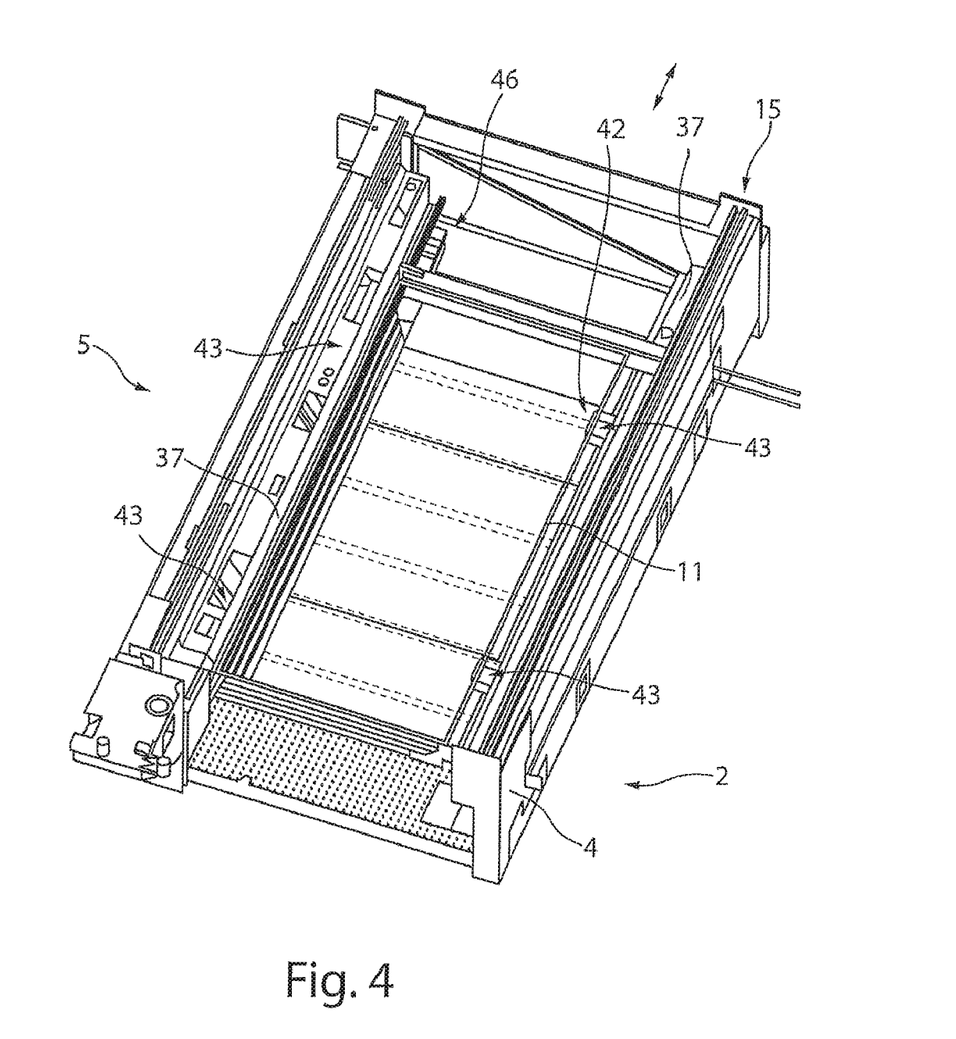
FIG. 4 is a perspective view from above of the machining station.

Within the machining station 5 depicted in FIG. 4, are four air spring modules 43 with four lifting cylinders 47 in total. In some embodiments, there may be three spring modules. Two lifting cylinders 47 are assigned to each longitudinal side of the machine base framework 44. The pallet carrier 46 includes two running surfaces 37 oriented parallel to each another. The pallet 11 is displaced along these running surfaces 37. The pallet 11 typically has rollers 39 that are supported on the running surfaces 37 (see FIGS. 7 and 8). Additionally, the machine 2 can also have a lateral guide for the pallet 11. The air spring modules 43 engage respectively on one of the longitudinal sides or transverse sides of the pallet 11 in a position of the pallet 11 that is retracted into the machining station 5. Here, these air spring modules 43 are spaced apart from one another along the longitudinal side of the pallet 11 in such a manner that the air spring modules 43 are oriented nearer to the respective end side than to the central axis, with respect to the longitudinal side of the pallet 11.

Figure 5:
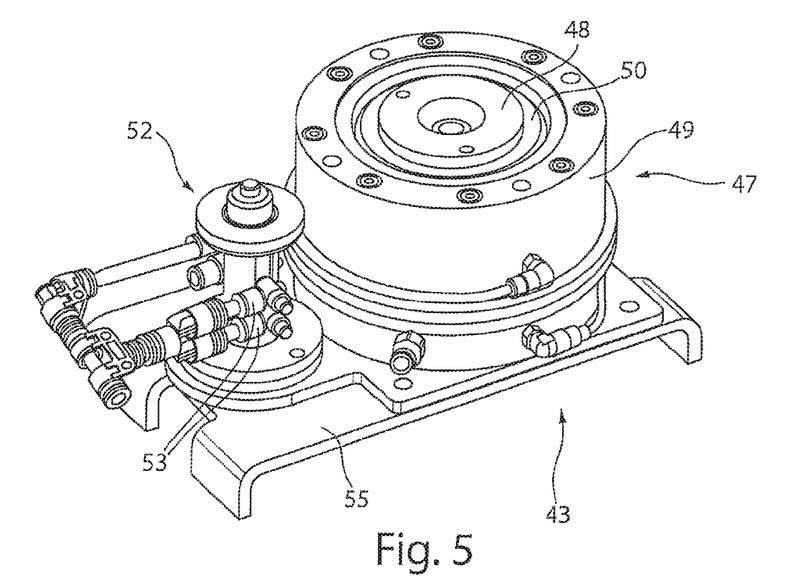
FIG. 5 is a perspective view of an air spring module of an air spring device.

In FIG. 5, an air spring module 43 is depicted in perspective. This air spring module 43 includes a pneumatic lifting cylinder 47 that includes an extendible stamp 48, where a rolling membrane 50 is provided between the stamp 48 and a housing 49. For example, a connector for control of the lifting cylinder 47 is depicted.

A distance control device 52 is adjacent to the lifting cylinder 47, the distance control device 52 being typically formed as a tactile pneumatic directional valve that controls the pressurization of the lifting cylinder 47. This control depends on the deviation of the lifting position from a target position which is fixedly set on the control device 52 and thus forms a position control circuit together with the lifting cylinder 47. The target position is set mechanically (e.g., via a knurled nut) directly on the tactile directional valve. Here, the entire valve body is adjusted in height. If the valve slide is deflected in the valve body (not visible) via a tactile tappet (not shown), pressurization of the lifting cylinder 47 thus results, which counteracts this deflection. Alternatively, the lifting position of the lifting cylinder 47 can be controlled via machine control.

Figure 6:
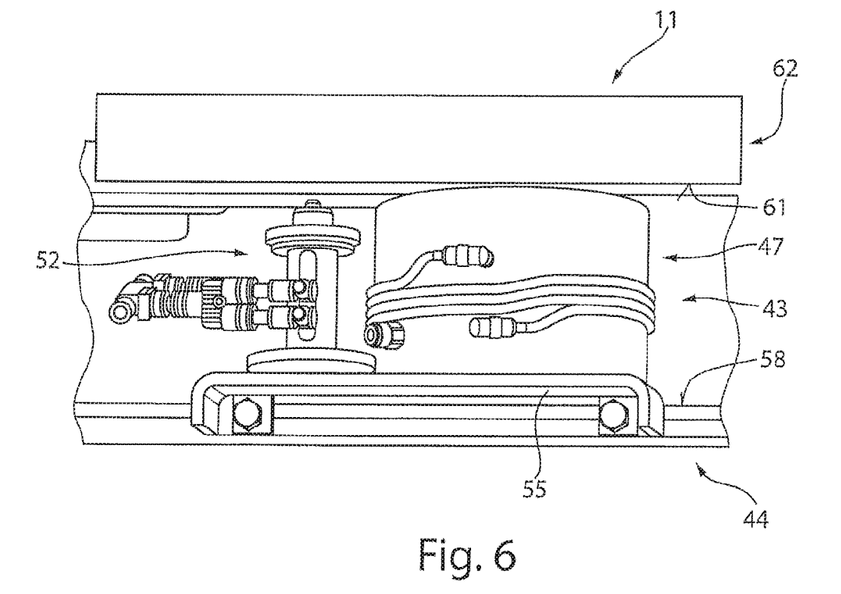
FIG. 6 is a first schematic view of the air spring module having a pallet in a resting position.

A schematic side view of an air spring module 43 in an installed arrangement with a mounting plate 55 on a resting surface 58 of the machine base fame 44 is depicted in FIG. 6. The pallet 11 is fully retracted into the machining station 5. A lower side 61 of a pallet frame 62 of the pallet 11 is opposite the lifting cylinder 47 of the air spring module 43. Likewise, the distance control device 52 is oriented relative to the underside 61 of the pallet frame 62 in the pallet 11.

Figure 7:
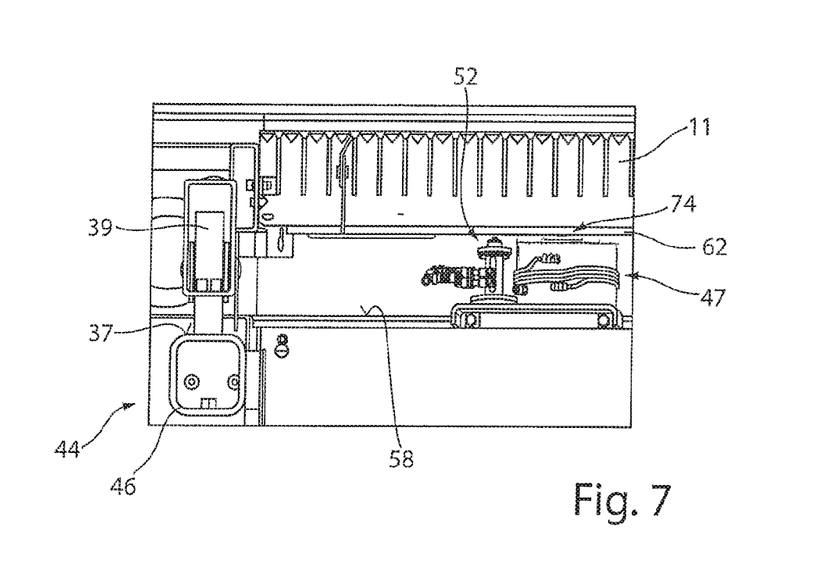
FIG. 7 is a further schematic view of the air spring module having a pallet in a resting position.

In FIG. 7, the pallet 11 retracted into the machining station 5 is depicted in somewhat more detail. The rollers 39 of the pallet 11 rest on the pallet carrier 46. The lifting cylinder 47 of the air spring module 43 does not bear against the pallet frame 62 as shown by the space indicated by arrow 74.

Figure 8:
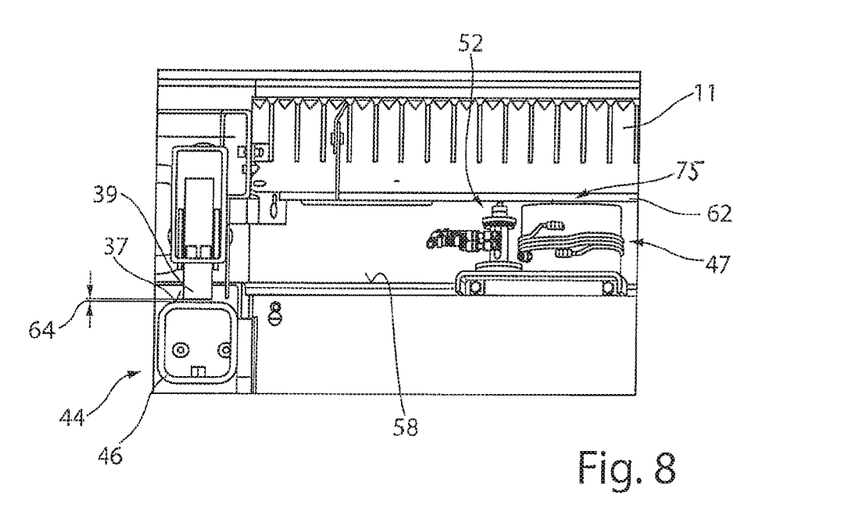
FIG. 8 is a schematic view of the air spring module having a pallet in a lifted position.

For lifting the pallet 11 when retracted into the machining station 5 into a lifted position of the pallet 11 with respect to the pallet carrier 46 and thus with respect to the machine base framework 44, the air spring modules 43 of the air spring device 42 are supplied with compressed air. As depicted in FIG. 8, the lifting cylinders 47 of the air spring module 43 engage on the pallet frame 62 according to arrow 75. The extended height is detected by the distance control device 52 and controlled to a predetermined height of the working stroke 64 of the air spring module 43. This extended position according to FIG. 8 is assumed until the machining of the plate-shaped material 8 resting on the pallet 11 is completed. Subsequently, the pallet 11 is lowered downwards again from the lifted position, such that the rollers 39 of the pallet 11 rest on the pallet carrier 46. Finally, the pallet 11 can be moved out of the machining station 5.

The height of the working stroke 64 for lifting and decoupling the pallet 11 from the machine base framework 44 is determined by the pallet 11 or its rollers 39 or similar being lifted by the running surface 37 of the pallet carrier 46. With shocks of the machine base framework 44, contact between the pallet 11 and the pallet carrier 46 during the machining of the plate-shaped material 8 is prevented.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for cutting a plate-shaped material in a machine that comprises a machining station in a machine base framework, wherein a machining unit of the machining station has at least one machining head for machining the plate-shaped material, and a loading station and unloading station assigned to the machining station, the method comprising:

placing the plate-shaped material on a displaceable pallet arranged between the machining station and the loading and unloading station;
retracting the pallet into the machining station for a subsequent machining process;
positioning the pallet on a pallet carrier of the machine base framework for the subsequent machining of the plate-shaped material;
before the beginning of the machining process of the plate-shaped material with the machining unit, lifting the pallet from the pallet carrier to a lifted position with an air spring device and positioning the pallet decoupled from the pallet carrier; and
after the machining process of the plate-shaped material, lowering the pallet and depositing the pallet on the pallet carrier.

2. The method of claim 1, wherein the pallet is held in the lifted position during the entire machining of the plate shaped material.

3. The method of claim 1, wherein the air spring device comprises at least three air spring modules that are activated for lifting the pallet.

4. The method of claim 3, wherein a lifting cylinder is extended during activation of the air spring modules.

5. The method of claim 4, wherein the lifting cylinder engages an underside of a pallet frame of the pallet.

6. The method of claim 3, wherein the lifted position of the pallet is monitored by at least one distance control device of the air spring module.

7. The method of claim 6, wherein the distance control device is a tactile directional valve.

8. The method of claim 1, wherein four or more lifting cylinders are simultaneously extended for lifting the pallet from a retracted position, wherein at least one air spring module is at a first longitudinal side of the machine base framework and at least two air spring modules are at a second longitudinal side of the machine base framework, wherein the air spring modules are supplied in a controlled manner with a fluid for a working stroke, and a further lifting cylinder is connected in parallel with one of the at least three air spring modules.

9. The method of claim 8, wherein the lifting cylinders are arranged in equal number on two respective longitudinal sides of the machine base framework.

10. The method of claim 1, further comprising displacing the machining head on the machine base framework for machining the plate-shaped material.

11. A machine for cutting a plate-shaped material, the machine comprising:

a machining station within a machine base framework, the machining station comprising a machine head for cutting the plate-shaped material resting on a pallet within the machining station;
a loading and unloading station outside the machining station;
a pallet carrier of the machine base framework configured to receive the pallet and the plate-shaped material as the pallet is retracted from the loading and unloading station into the machining station; and
an air spring device arranged in the machining station, wherein the air spring device is configured to transfer the pallet, which has been retracted into the machining station, from a resting position on the pallet carrier into a lifted position with respect to the pallet carrier before machining of the plate-shaped material, and to transfer the pallet to the resting position after the machining of the plate-shaped material.

12. The machine of claim 11, wherein the air spring device comprises at least three air spring modules for transferring the pallet between the resting position and the lifted position.

13. The machine of claim 12, wherein at least one of the air spring modules comprises a lifting cylinder and a distance control device.

14. The machine of claim 13, wherein the lifting cylinder and the distance control device are arranged on a mutual mounting plate.

15. The machine of claim 13, wherein the distance control device is a tactile directional valve that controls a fluid for supplying the lifting cylinder.

16. The machine of claim 13, wherein the at least three air spring modules are arranged on the pallet carrier and/or on the machine base framework for a static three-point support of the pallet.

17. The machine of claim 16, wherein the lifting cylinders of the air spring module engage on an underside of a pallet frame of the pallet.

18. The machine of claim 12, wherein the lifting cylinder has a working stroke such that the pallet is lifted while decoupled from the machine base framework after an at least partial pass of the working stroke.

19. The machine of claim 12, wherein at least two lifting cylinders are arranged on each longitudinal side of the machine base framework.

20. The machine of claim 12, wherein
at least two lifting cylinders are arranged on each longitudinal side of the machine base framework,
at least one air spring module is arranged on a longitudinal side of the machine base framework,
at least two air spring modules which are arranged on a second longitudinal side of the machine base framework and are supplied with a fluid for a working stroke in a controlled manner, and
a fourth or further lifting cylinder is connected in parallel with one of the three air spring modules that are supplied in a controlled manner.

* * * * *